United States Patent
Kobayashi et al.

(10) Patent No.: US 10,083,072 B2
(45) Date of Patent: Sep. 25, 2018

(54) ABNORMALITY HANDLING DETERMINATION PROGRAM, METHOD FOR ABNORMALITY HANDLING DETERMINATION, AND ADMINISTRATION DEVICE

(71) Applicant: FUJITSU LIMITED, Kawasaki-shi, Kanagawa (JP)

(72) Inventors: Kenji Kobayashi, Kawasaki (JP); Masazumi Matsubara, Machida (JP); Yoshinori Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 15/205,502

(22) Filed: Jul. 8, 2016

(65) Prior Publication Data

US 2017/0046213 A1    Feb. 16, 2017

(30) Foreign Application Priority Data

Aug. 14, 2015    (JP) .............................. 2015-160179

(51) Int. Cl.
G06F 11/00 (2006.01)
G06F 11/07 (2006.01)
G06F 11/20 (2006.01)

(52) U.S. Cl.
CPC ........ *G06F 11/079* (2013.01); *G06F 11/0727* (2013.01); *G06F 11/0751* (2013.01); *G06F 11/20* (2013.01)

(58) Field of Classification Search
CPC ............. G06F 11/0727; G06F 11/0751; G06F 11/079; G06F 11/20
See application file for complete search history.

(56) References Cited

U.S. PATENT DOCUMENTS

| | | | |
|---|---|---|---|
| 7,146,521 B1 * | 12/2006 | Nguyen | G06F 1/206 714/2 |
| 2004/0162940 A1 | 8/2004 | Yagisawa et al. | |
| 2005/0081087 A1 | 4/2005 | Yagisawa et al. | |
| 2010/0205396 A1 | 8/2010 | Okada et al. | |
| 2013/0205070 A1 | 8/2013 | Koseki et al. | |

FOREIGN PATENT DOCUMENTS

| | | |
|---|---|---|
| JP | 2001-034500 | 2/2001 |
| JP | 2006-164304 | 6/2006 |
| JP | 2008-052752 | 3/2008 |
| JP | 2015-505078 | 2/2015 |
| WO | 2008/146473 | 12/2008 |
| WO | 2013/118170 | 8/2013 |

* cited by examiner

*Primary Examiner* — Joshua P Lottich
(74) *Attorney, Agent, or Firm* — Fujitsu Patent Center

(57) ABSTRACT

A non-transitory computer readable storage medium storing therein an abnormality handling determination program that causes a computer to execute a process, the process includes, acquiring state information of appointed items regarding to a state of each of a plurality of devices in a system depending on a detection of abnormal information of a first device among the plurality of devices, judging whether the state information of the first device deviates from the distribution range of the state information calculated by the state information of the devices except the first device for every item, and determining a handling for the first device based on a result of the judgment.

17 Claims, 19 Drawing Sheets

FIG. 6

| DISK ID | ACCESS LOAD (IO/sec) | NUMBER OF BAD SECTORS | TEMPERATURE (°C) | OPERATION TIME (sec) |
|---|---|---|---|---|
| 0001 | 6422 | 3 | 32 | 31536324 |
| 0002 | 35240 | 2 | 33 | 31577324 |
| 0003 | 2300 | 1 | 30 | 31622345 |
| 0004 | 3203 | 0 | 29 | 31531112 |
| 0005 | 6587 | 3 | 33 | 31543367 |
| 0006 | 8953 | 0 | 34 | 31561999 |
| ... | | | | |

| DISK ID | TIME | ACCESS LOAD (IO/sec) | NUMBER OF BAD SECTORS | TEMPERATURE (°C) | OPERATION TIME (sec) |
|---|---|---|---|---|---|
| 0001 | 2015-03-30 10:00:00 | 2422 | 3 | 32 | 31536324 |
| 0002 | 2015-03-30 10:00:00 | 4039 | 2 | 33 | 31577324 |
| 0003 | 2015-03-30 10:00:00 | 2300 | 1 | 30 | 31622345 |
| 0004 | 2015-03-30 10:00:00 | 3203 | 0 | 29 | 31531112 |
| 0005 | 2015-03-30 10:00:00 | 6587 | 3 | 33 | 31543367 |
| 0006 | 2015-03-30 10:00:00 | 8953 | 0 | 34 | 31561999 |
| ... | | | | | |
| 0001 | 2015-03-30 10:10:00 | 2522 | 3 | 32 | 31536924 |
| 0002 | 2015-03-30 10:10:00 | 4139 | 2 | 33 | 31577924 |
| 0003 | 2015-03-30 10:10:00 | 3302 | 1 | 30 | 31622945 |
| 0004 | 2015-03-30 10:10:00 | 3243 | 0 | 29 | 31531712 |
| 0005 | 2015-03-30 10:10:00 | 6787 | 3 | 33 | 31543967 |
| 0006 | 2015-03-30 10:10:00 | 7753 | 0 | 34 | 31562599 |
| ... | | | | | |

FIG. 8

| | DEVIATION ITEM 1 | DEVIATION ITEM 2 | ... | DEVIATION ITEM N | USE (HANDLING) |
|---|---|---|---|---|---|
| 1 | ACCESS LOAD | - | | - | LOWERING ACCESS LOAD (STRIPING : TWO DISK DEVICES) |
| 2 | NUMBER OF BAD SECTORS | - | | - | INCREASE REDUNDANCY DEGREE (MIRRORING) |
| 3 | TEMPERATURE | - | | - | LOWERING ACCESS LOAD (STRIPING : TWO DISK DEVICES) |
| 4 | OPERATION TIME | - | | - | BACKUP |
| ... | | | | | |
| 11 | ACCESS LOAD | TEMPERATURE | | | LOWERING ACCESS LOAD (STRIPING : THREE DISK DEVICES) |
| 12 | NUMBER OF BAD SECTORS | TEMPERATURE | | | INCREASE REDUNDANCY DEGREE (MIRRORING) |
| ... | | | | | |
| 20 | NO DEVIATION ITEM | - | | - | CONTINUOUS USE |
| 21 | ALL | - | | - | SEPARATION |

| DISK ID | ACCESS LOAD (IO/sec) | NUMBER OF BAD SECTORS | TEMPERATURE (°C) | OPERATION TIME (sec) |
|---|---|---|---|---|
| 0001 | 6422 | 3 | 32 | 30786324 |
| 0002 | 12443 | 2 | 33 | 31577324 |
| 0003 | 2300 | 1 | 30 | 32002345 |
| 0004 | 3203 | 0 | 29 | 31591112 |
| 0005 | 6587 | 3 | 33 | 31043367 |
| 0006 | 3245 | 0 | 34 | 30361999 |
| ... | | | | |

| 4.52 | 0.44 | 0.75 | 0.72 |

FIG. 11

| DISK ID | ACCESS LOAD (IO/sec) | NUMBER OF BAD SECTORS | TEMPERATURE (°C) | OPERATION TIME (sec) |
|---|---|---|---|---|
| 0001 | 6422 | 3 | 32 | 30786324 |
| 0002 | 12443 | 2 | 40 | 31577324 |
| 0003 | 2300 | 1 | 30 | 32002345 |
| 0004 | 3203 | 0 | 35 | 31591112 |
| 0005 | 6587 | 3 | 33 | 31043367 |
| 0006 | 3245 | 0 | 34 | 30361999 |
| ... | | | | |
| | 4.52 | 0.44 | 4.18 | 0.72 |

| DISK ID | ACCESS LOAD (IO/sec) | NUMBER OF BAD SECTORS | TEMPERATURE (°C) | OPERATION TIME (sec) |
|---|---|---|---|---|
| 0001 | 6422 | 3 | 32 | 30786324 |
| 0002 | 12443 | 8 | 40 | 33177324 |
| 0003 | 2300 | 3 | 30 | 32002345 |
| 0004 | 3203 | 0 | 35 | 31591112 |
| 0005 | 6587 | 4 | 33 | 31043367 |
| 0006 | 3245 | 2 | 34 | 30361999 |
| ... | | | | |

| 4.52 | 4.13 | 4.18 | 3.53 |

FIG. 13

| DISK ID | ACCESS LOAD (IO/sec) | NUMBER OF BAD SECTORS | TEMPERATURE (°C) | OPERATION TIME (sec) |
|---|---|---|---|---|
| 0001 | 6422 | 3 | 32 | 30786324 |
| 0002 | 7632 | 2 | 33 | 31577324 |
| 0003 | 2300 | 1 | 30 | 32002345 |
| 0004 | 3203 | 0 | 29 | 31591112 |
| 0005 | 6587 | 3 | 33 | 31043367 |
| 0006 | 3245 | 0 | 34 | 30361999 |
| ... | | | | |

| 1.83 | 0.44 | 0.75 | 0.72 |

FIG. 19

| DEVICE ID | DISK ID | ACCESS LOAD (IO/sec) | NUMBER OF BAD SECTORS | TEMPERATURE (°C) | OPERATION TIME (sec) |
|---|---|---|---|---|---|
| 0001 | 0001 | 6422 | 3 | 32 | 31536324 |
| 0001 | 0002 | 35240 | 2 | 33 | 31577324 |
| 0001 | 0003 | 2300 | 1 | 30 | 31622345 |
| 0001 | 0004 | 3203 | 0 | 29 | 31531112 |
| 0001 | 0005 | 6587 | 3 | 33 | 31543367 |
| 0001 | 0006 | 8953 | 0 | 34 | 31561999 |
| ... | ... | | | | |
| 0002 | 0001 | 4422 | 3 | 32 | 31536324 |
| 0002 | 0002 | 2240 | 2 | 33 | 31577324 |
| 0002 | 0003 | 2300 | 1 | 30 | 31622345 |
| 0002 | 0004 | 3203 | 0 | 29 | 31531112 |
| 0002 | 0005 | 6587 | 3 | 33 | 31543367 |
| 0002 | 0006 | 8953 | 0 | 34 | 31561999 |
| ... | ... | | | | |

250

ABNORMALITY HANDLING DETERMINATION PROGRAM, METHOD FOR ABNORMALITY HANDLING DETERMINATION, AND ADMINISTRATION DEVICE

CROSS-REFERENCE TO RELATED APPLICATION

This application is based upon and claims the benefit of priority of the prior Japanese Patent Application No. 2015-160179, filed on Aug. 14, 2015, the entire contents of which are incorporated herein by reference.

FIELD

The embodiments discussed herein are related to an abnormality handling determination program, a method for abnormality handling determination and an administration device.

BACKGROUND

The storage system is equipped with a plurality of disk devices, and works as a large-capacity storage. The information processing device accesses a plurality of disk devices through a network, etc.

When the state administration device in the storage system detects, for example, a trouble sign of the disk device, the device performs specific handling for the storage device to raise a reliability (a difficulty of losing data). For example, when the state administration device detects the trouble sign of the disk device, the state administration device starts the mirroring with other disk devices and separates the disk device that the trouble sign was detected. The state administration device in this way avoids the loosing of the data which is memorized when the trouble really occurs to the disk device.

For example, the technique about the system with a plurality of disk devices is listed in patent documents 1 and 2.

CITATION LIST

Patent Document

[Patent document 1] Japanese Laid-Open Patent Publication No. 2008-52752
[Patent document 2] Japanese Laid-Open Patent Publication No. 2006-164304

SUMMARY

However, the trouble sign may not accord with a state of the disk device. Therefore, when the device performs specific handling depending on the detection of the trouble sign, there may be a case of handling for the factor that is different from the factor of the trouble of the disk device or a case of performing the handling even though the trouble does not occur.

By performing the handling that does not accord with the real state of the device, the replace of the disk device become frequent, and cost increases.

According to an aspect of the embodiments, a non-transitory computer readable storage medium storing therein an abnormality handling determination program that causes a computer to execute a process, the process includes acquiring state information of appointed items regarding to a state of each of a plurality of devices in a system depending on a detection of abnormal information of a first device among the plurality of devices, judging whether the state information of the first device deviates from the distribution range of the state information calculated by the state information of the devices except the first device for every item, and determining a handling for the first device based on a result of the judgment.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram indicating an example of the state information table 150 depicted in FIG. 4 and FIG. 5.
FIG. 7 is a diagram explaining an example of the state information that the state monitoring module 141 explained in FIG. 5 acquires.
FIG. 8 is a diagram indicating an example of state/use mapping information 160 explained in FIG. 4 and FIG. 5.
FIG. 10 is a diagram explaining the first example of the processing in flow chart of FIG. 9.
FIG. 11 is a diagram explaining the second example of the processing of flow chart in FIG. 9.
FIG. 12 is a diagram explaining the third example of the processing in flow chart of FIG. 9.
FIG. 13 is a diagram explaining the fourth example of the processing of flow chart in FIG. 9.
FIG. 19 is a diagram indicating an example of state information table 250 according to the other embodiment.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Storage System

Figure 1:
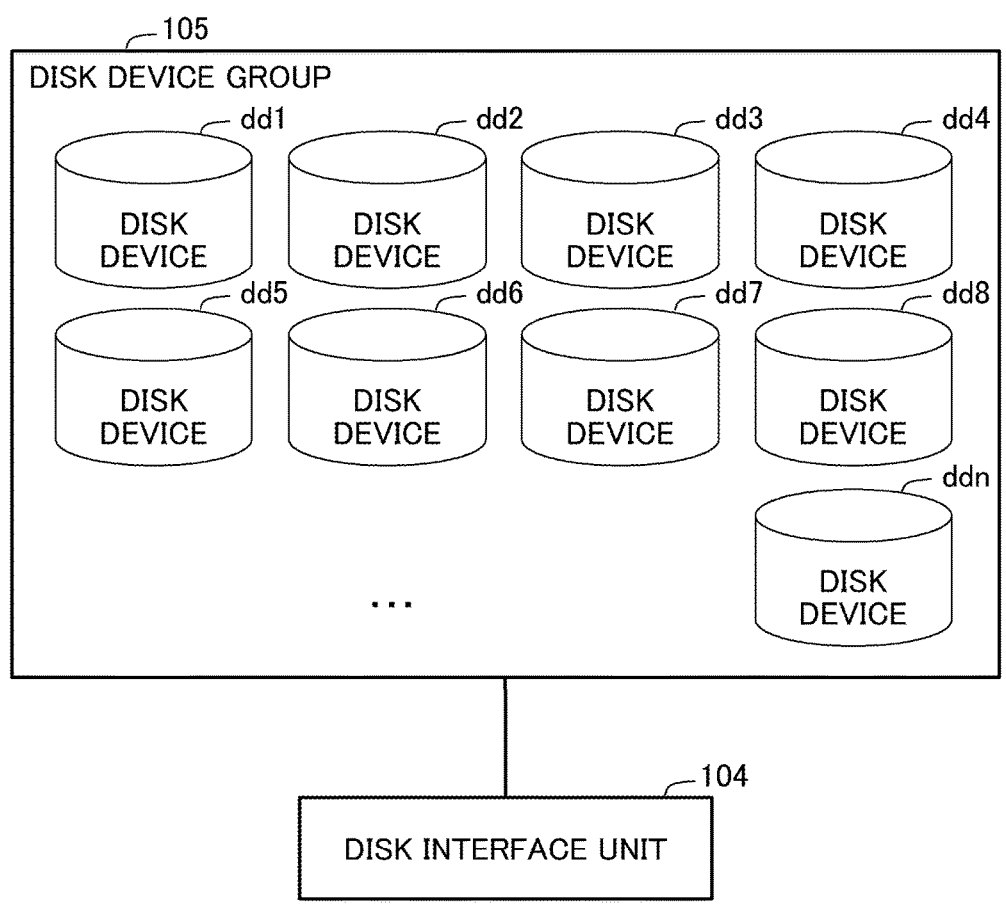
FIG. 1 is a diagram indicating an example of the storage system according to an embodiment.

FIG. 1 is a diagram indicating an example of the storage system according to an embodiment. As illustrated in FIG. 1, the storage system comprises disk device group 105. The disk device group 105 has disk devices "dd1"-"ddn" (below also called as disk device "dd"). In addition, each of disk devices "dd" connects with a CPU (not illustrated in FIG. 1) or other information processing devices (not illustrated in FIG. 1) through a disk interface unit 104, etc.

For example, the disk device group 105 depicted in FIG. 1 is consisted of disk array. The disk array indicates a technique to use a plurality of disk devices "dd1"-"ddn" as one large-capacity disk device. The administration method of data in the disk array includes RAID (Redundant Arrays of Inexpensive Disk devices), for example. The RAID technique is to operate as one virtual disk device by putting a plurality of disk devices "dd" together, thereby increasing a redundant.

A different redundant degree is settable for each of disk array each. For example, the redundant degrees include RAID0, RAID1, RAID3, and RAID5, etc. The RAID0 indicates a method to separate single data and to store it to a plurality of disk devices "dd" with a distribution manner, and is called as a striping. According to the RAID0, it is possible to access data for the data which is stored in distribution manner in parallel although there is not the redundancy of the data.

The RAID1 indicates a method to write the same data in a plurality of disk devices "dd" and is called a mirroring. The RAID1 has the redundancy of data since a plurality of disk devices "dd" hold the same data. Therefore, it is possible to use memorized data for other disk device "dd" even if a faulty occurs in one disk device "dd".

The RAID3, RAID5 have high more redundant degree for the RAID1. The RAID3 is a method to divide data and write it in a plurality of disk devices "dd" and store parity generated based on the data which is divided into another disk device "dd". In addition, the RAID5 indicates a method to store both of data and parity in a plurality of disk devices "dd" with a distributed manner.

Comparison Example

Figure 2:
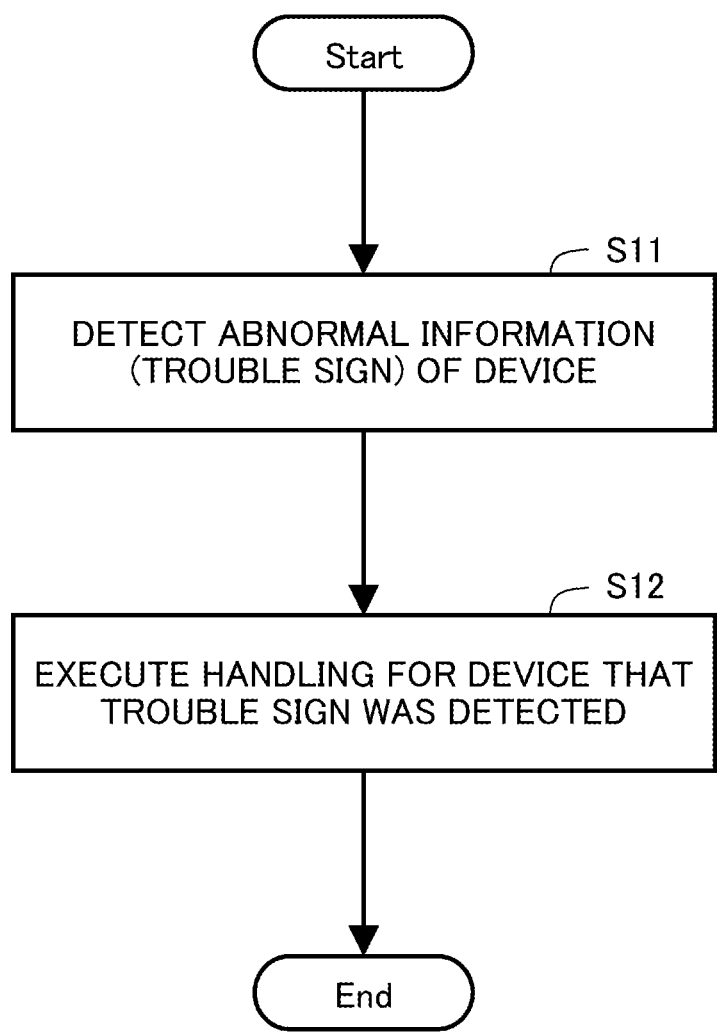
FIG. 2 is a diagram of flow chart explaining a flow of handling for the disk device depending on detection of the trouble sign of the disk device according to the comparison example.

FIG. 2 is a diagram of flow chart explaining a flow of handling for the disk device depending on detection of the trouble sign of the disk device according to the comparison example.

S11: A state administration device according to the comparison example detects the abnormal information (also called as the trouble sign as follows) of a certain disk device among disk device group depicted in FIG. 1. The state administration device detects the trouble sign based on a comparison of a predetermined value determined beforehand and the value of each disk device, for example.

For example, the state administration device detects the trouble sign when the accumulation operation time for disk device reaches at life time (predetermined value) set depending on the specification of the disk device beforehand. Or, for example, the state administration device detects the trouble sign when the error number of times of the disk device reaches the predetermined value beforehand.

S12: The state administration device carries out a fixed handling which is determined beforehand for the disk device that the trouble sign was detected. For example, the state administration device starts the mirroring which writes same data in both of the disk device that the trouble sign was detected and the disk device which is different from the disk device that the trouble sign was detected then separates the disk device that the trouble sign was detected, as the handling. In another form, the state administration device changes the use of the disk device that the trouble sign was detected for backup, as the handling.

In this way, the state administration device performs the handling which is determined beforehand when the device detects the trouble sign. When trouble really occurred to the disk device that the trouble sign was detected, it restrains that memorized data are lost and the reliability (a hardly losing) of data is maintained.

However, the trouble sign does not always to accord with the state of the disk device. For example, the disk device may work normally even if the trouble sign is detected based on the accumulation operation time. Or the state of the disk device may turn worse than an assumption when the trouble sign is detected.

In addition, the disk device may work normally when an error is a slight error, even if the trouble sign is detected based on the error number of times. Or the state of the disk device may turn worse than an assumption when the trouble sign was detected when the error is a serious error.

Accordingly, a fixed handling which performs depending on the detection of the trouble sign may not accord with the state of the disk device and may not be appropriate handling. By performing an inappropriate handling, though the state of the disk device works normally, a disk device may become a target of the exchange early. Or there is a case that the state of the disk device turns worse or a case which is not able to improve though there may be a possibility of improvement of the state of the disk device.

In this way, exchange of the disk device becomes frequent, and cost may increase by performing specific handling depending on detection of the trouble sign to improve the reliability of data. Appropriate handling for the disk device is different depending on a state to a real disk device. Therefore, it is desirable that handling depending on the real state of the disk device is performed when trouble sign is detected.

Summary of Embodiment

Therefore, the state administration device according to the embodiment acquires the state information of the appointed item about the state of each of a plurality of devices depending on detection of the abnormality information of the first device among the plurality of devices (disk device "dd") included in the system. And the state administration device judges whether or not the state information of the first device deviates from the distribution range of the state information calculated by the state information of the device except the first device for the appointed item and decides the handling for the first device based on a judgment result.

For example, the system indicates a storage system depicted in FIG. 1. The state information is information about the states of disk device "dd". For example, the appointed item (also called as the item) according to the embodiment is either or combination of access load for the disk device "dd", temperature of the disk device "dd", the number of the abnormal parts (bad sector) of disk device "dd", and the operation time of disk device "dd".

In addition, the embodiment exemplifies the case that a device is disk device "dd", but it is not a thing limited to this example. A device may be an information processor, a wireless device, or machinery included in a factory. When a device is a device unlike the disk device "dd", the item may be different information about the states of the device (CPU utilization rate or delay information, etc.).

Figure 3:
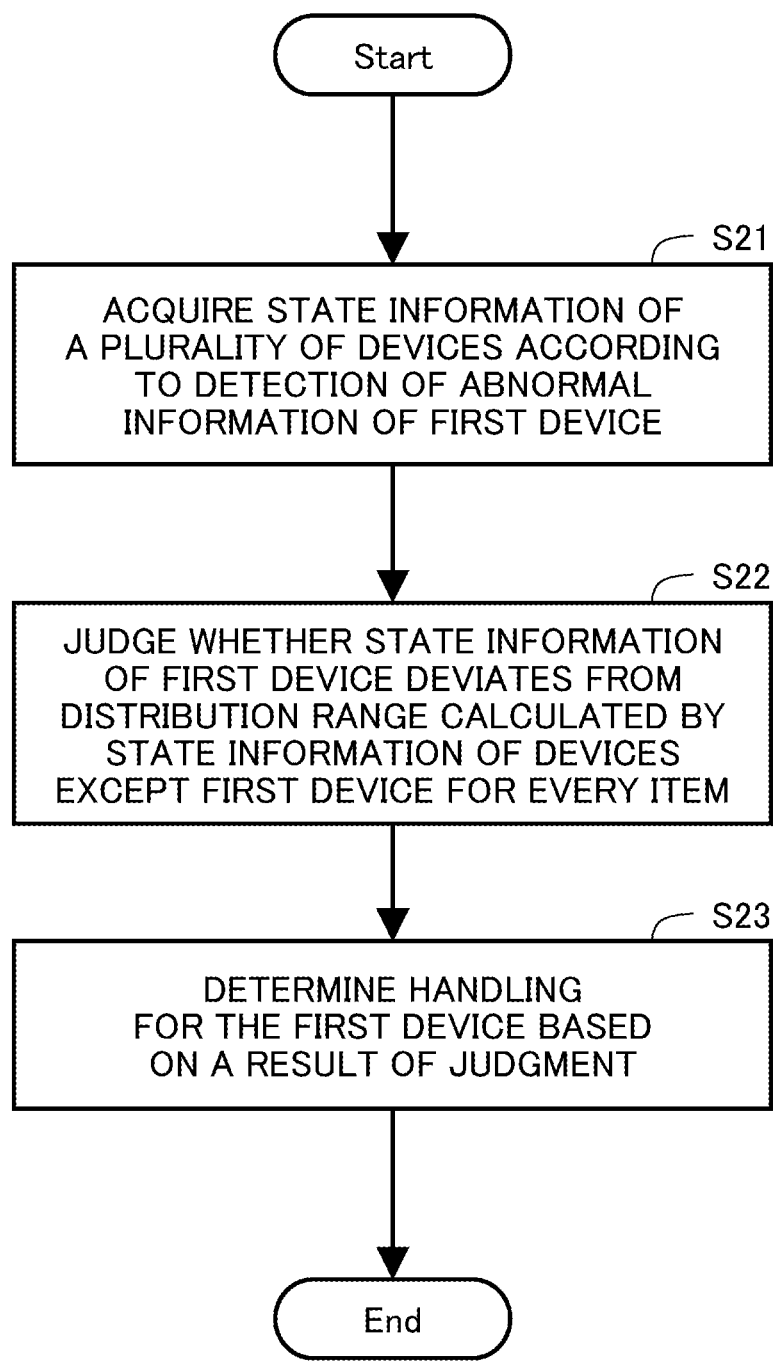
FIG. 3 is a diagram of flow chart explaining a flow of the processing of state administration devices according to the embodiment.

FIG. 3 is a diagram of flow chart explaining a flow of the processing of state administration devices according to the embodiment.

S21: The state administration device acquires the state information for every item of a plurality of disk device "dd" including the first device depending on the detection of the abnormal information (trouble sign) of a certain disk device "dd" (the first device). For example, the state administration device acquires state information of the disk devices "dd1"-"ddn" depending on the detection of the trouble sign of the disk device "dd2" among the disk device group 105 (referring to FIG. 1).

As similar to a comparison example, the state administration device detects trouble sign based on life or the error number of times. For example, the state administration device detects trouble sign when the operation time of the disk device "dd" reaches the life determined based on specification of disk device "dd". Or, for example, the state administration device detects trouble sign when the error number of times of disk device "dd" is over the predetermined value which is determined beforehand.

S22: The state administration device judges whether the state information of the first disk device "dd" deviates from the distribution range of the state information calculated by the state information of disk device devices "dd" except the first disk device, based on state information of a plurality of disk devices "dd" which is acquired for every item. In other words, the state administration device judges, item by item, whether the state information of the disk device "dd2" deviates from the distribution range of the state information of the disk devices "dd1", "dd3"-"ddn".

S23: The state administration device decides the handling for the first disk device "dd" (disk device "dd2") based on a judgment result. For example, the state administration device decides the handling for the disk device "dd2" based on the item where a value of the state information of the disk device "dd2" deviates from the distribution range of the state information calculated by the state information of the disk devices "dd1", "dd3"-"ddn". Or the state administration device decides the handling indicating continuously using for the disk device "dd2" when there is not an item deviating.

In this way, it is possible that the state administration device according to the embodiment decides appropriate handling based on a comparison of the state information with other disk device "dd", not performing a fixed handling, depending on the trouble sign. Thereby it is possible that the state administration device decides the handling according to a state of disk device "dd" even if the trouble sign does not accord with a state of real disk device "dd".

Therefore, it is possible that the state administration device decides appropriate handling depending on the state concerned when an abnormal state really occurs in the disk device "dd". Thereby it is possible that the state administration device realizes the improvement of the state of disk device "dd" and restrains the life aggravation of the disk device "dd". In addition, it is possible that the state administration device decides appropriate handling indicating the use of continuation without performing a change for disk device "dd" when an abnormal state does not occur in the disk device "dd".

In this way, it is possible that the state administration device holds exchange frequency of disk device "dd" while improving the reliability of data, because it is restrained to limit a use of disk device "dd". Therefore, it is possible that the state administration device decreases the cost while improving the reliability of data.

In addition, the normal distribution range (the standard value) of the state information of each item of the disk device "dd" varies depending on the access frequency for the disk device "dd" or duties or environment to use, for example. Therefore, about each item of disk device "dd", it is not easy to calculate the standard value of the state information.

In contrast, the state administration device according to the embodiment judges whether the state information of the disk device "dd" where trouble sign was detected is the value that deviates from the distribution range of the state information calculated by the state information of other disk device "dd". And the state administration device judges whether an abnormal state occurs in the disk device "dd" where the trouble sign was detected based on a judgment result. Accordingly, it is possible that the state administration device according to the embodiment judges an item of the state information indicating the abnormal state easily without setting the standard value of the state information of each item for every disk device.

Then, according to FIG. 4, the hardware constitution of the state administration device according to the embodiment and according to FIG. 5, software block diagram of the state administration device in FIG. 4 will be described.

Hardware Constitution of State Administration Device

Figure 4:
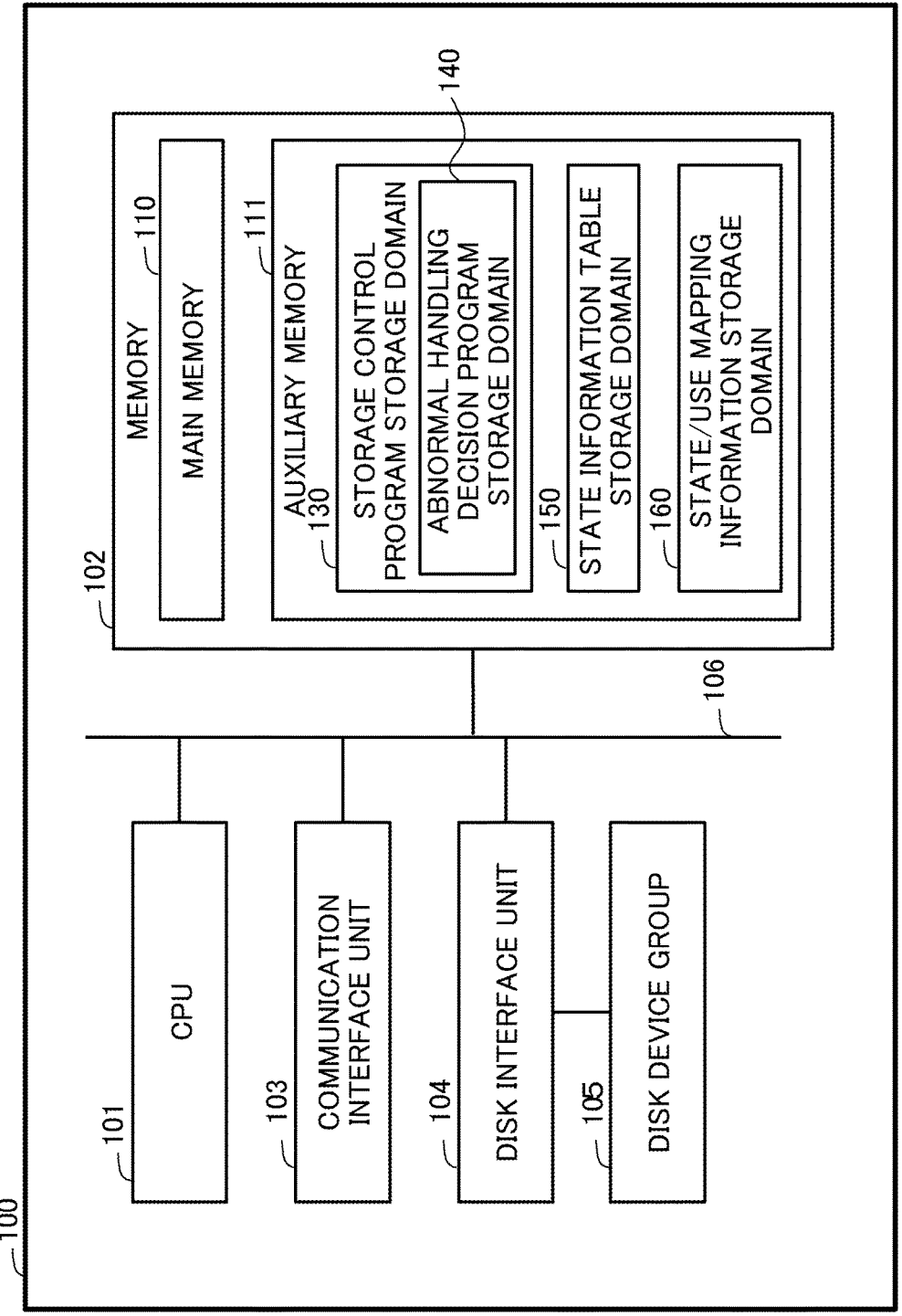
FIG. 4 is a diagram of hardware constitution of state administration device (information processing device) according to the embodiment.

FIG. 4 is a diagram of hardware constitution of state administration device (information processing device) according to the embodiment. The state administration device 100 includes a CPU (Central Processing Unit) 101, a memory 102 having a main memory 110 and an auxiliary memory 111, etc., a communication interface unit 103, a disk interface unit 104, and the disk device group 105. The all parts are connected through a bus 106 mutually.

The CPU 101 is connected to the memory 102, etc. through the bus 106 and controls the whole state administration device 100. The communication interface unit 103 is connected to other apparatuses (not illustrated in FIG. 4) through the Internet, etc. and transmits and receives data.

The disk device group 105 has a plurality of disk devices "dd" as depicted in FIG. 1. The disk interface unit 104 is connected to the disk device group 105 and performs control processing of each disk device "dd" in the disk device group 105.

The disk device group 105 provides the area based on the RAID as illustrated by FIG. 1. The disk interface unit 104 performs the writing of data in the disk device "dd" and reading of data memorized in the disk device "dd" in response to the command accepted from the CPU 101, etc. In addition, the disk interface unit 104 performs setting of RAID of mirroring or striping for the disk device "dd" and separating and controlling of offline or online in response to the command accepted from the CPU 101.

The main memory 110 includes a RAM (Random Access Memory) memorizes the data which the CPU 101 processes.

The auxiliary memory 111 is constructed by an HDD (Hard disk device drive) or a nonvolatile semiconductor memory.

The auxiliary memory 111 has a domain (not illustrated in FIG. 4) which stores the operation system which CPU 101 carries out and a domain (not illustrated in FIG. 4) which stores a program using the disk device "dd". In addition, the auxiliary memory 111 has storage control program storage domain 130, state information table storage domain 150, state/use mapping information storage domain 160. In addition, the storage control program storage domain 130 has abnormality handling determination (decision) program storage domain 140.

The storage control program (below called as storage control program 130) in the storage control program storage domain 130 realizes an access control for the disk device group 105 and a storage administration processing including a setting of RAID by execution of the CPU 101.

The abnormal handling decision program (below called as abnormality handling decision program 140) in the abnormality handling decision program storage domain 140 realizes a decision processing of the handling for the disk device "dd" concerned depending on the detection of the trouble sign of the disk device "dd" by execution of the CPU 101.

A state information table (below called as state information table 150) in the state information table storage domain 150 is a table that the abnormality handling decision program 140 accesses and has state information of a plurality of disk devices "dd". The details of the state information table 150 will be mentioned later according to FIG. 6.

A state/use mapping information (below called as state/use mapping information 160) in the state/use mapping information storage domain 160 is the information that the abnormality handling decision program 140 refers to and has correspondence information between the state and use of the disk device "dd". The details of the state/use mapping information 160 will be mentioned later according to FIG. 8.

Software Block of State Administration Device 100

Figure 5:
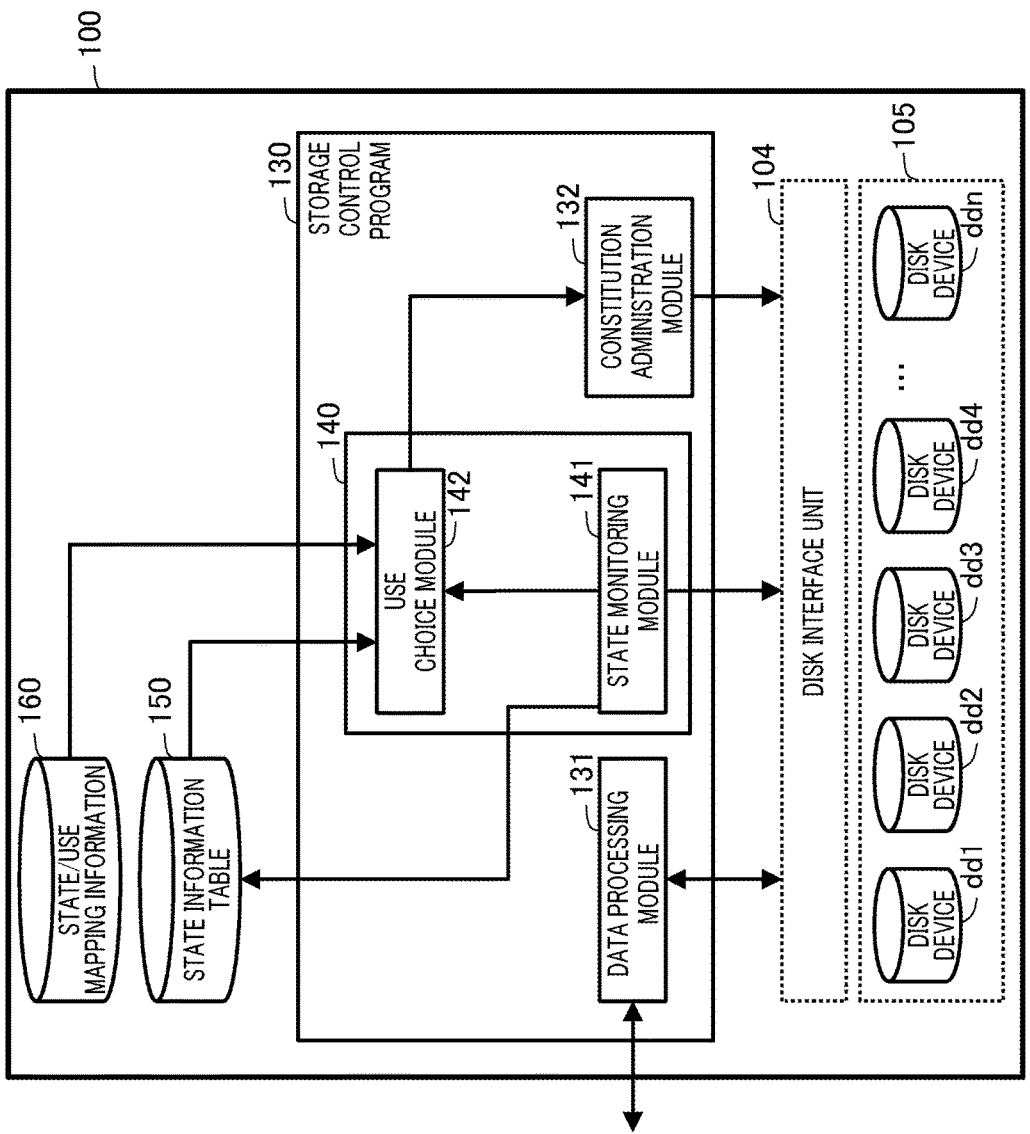
FIG. 5 is a diagram of constitution of the software block of the state administration device 100 depicted in FIG. 4.

FIG. 5 is a diagram of constitution of the software block of the state administration device 100 depicted in FIG. 4. As illustrated in FIG. 5, the storage control program 130 has an abnormality handling decision program 140, a data processing module 131, and a constitution administration module 132. The abnormality handling decision program 140 has a state monitoring module 141 and a use choice module 142.

The state monitoring module 141 acquires state information of each disk device "dd" regularly (for example, ten minutes interval) and memorizes it to the state information table 150. In addition, the state monitoring module 141 holds the life or the error number of times of each disk device "dd" and detects the trouble sign, for example. And the state monitoring module 141 acquires the state information of each disk device "dd" depending on the detection of the trouble sign and memorizes it into the state information table 150 and notifies the use choice module 142 of outbreak of the trouble sign.

When the use choice module 142 receives the notice indicating the detection of the trouble sign from the state monitoring module 141, the use choice module 142 refers to the state information table 150. And the use choice module 142 judges, item by item, whether or not the state information of disk device "dd" that the trouble sign was detected deviates from the distribution range of the state information calculated by the state information of other disk devices "dd". And the use choice module 142 refers to the state/use mapping information 160 based on the judgment result, decides the handling for the disk device "dd" where trouble sign was detected, and requests the constitution administration module 132 for execution of the handling.

The data processing module 131 instructs the access processing for the disk device "dd" to the disk interface unit 104 in response to the command to instruct the access of data. The access processing includes the writing data to the disk device "dd" and reading of data from the disk device "dd".

In addition, the constitution administration module 132 manages the information about the constitution of each disk device "dd". For example, the information about the constitution of disk device "dd" includes information such as the group setting indicating the administration unit of RAID or the setting of the redundant degree of the group. In addition, the constitution administration module 132 carries out the handling (for example, change of the redundant degree of the group, use change to backup use, separate, change to near-online) depending on a request of the handling from the use choice module 142.

State Information Table 150

FIG. 6 is a diagram indicating an example of the state information table 150 depicted in FIG. 4 and FIG. 5. For example, the state information table 150 depicted in FIG. 6 stores the items of the state information including an item "disk ID (IDentify)", an item "access load (IO/sec)", an item "number of bad sectors", an item "temperature" (Celsius), and an item "operation time (sec)". But the item is not a thing limited to an example depicted in FIG. 6. The state information table 150 may have an item of other state information. In addition, the item may be one or a plurality of number.

The item "disk ID" is information to distinguish the disk device "dd". The item "access load (IO/sec)" indicates quantity of the access processing for the disk device "dd" per one second. The item "number of bad sectors" indicates the number of bad sectors among the sectors which the disk device "dd" has. The item "temperature" (Celsius) indicates temperature of the disk device "dd". The item "operation time (sec)" indicates total time of the operation time of the disk device "dd".

According to the example of FIG. 6, for the disk ID "001", the access load is "6422 (IO/sec)", the number of bad sectors is "3", the temperature is "32" (Celsius), and the operation time is "31536324 (sec)". In addition, for the disk ID "002", the access load is "35240 (IO/sec)", the number of bad sectors is "2", the temperature is "33" (Celsius), and the operation time is "31577324 (sec)". The state information table 150 has similar stare information of each item about the disk device "dd" of other disk ID.

FIG. 7 is a diagram explaining an example of the state information that the state monitoring module 141 explained in FIG. 5 acquires. As mentioned above in FIG. 5, the state monitoring module 141 acquires state information of each disk device "dd", for example, every interval for ten minutes and memorizes it to the state information table 150. FIG. 7 represents an example of the state information at the time "2015-03-30 10:00:00" and at the time "2015-03-30 10:10:00". In this way, the state information table 150 maintains the state information of each disk device "dd" to indicate in FIG. 1 every interval at time.

State/Use Mapping Information 160

FIG. 8 is a diagram indicating an example of state/use mapping information 160 explained in FIG. 4 and FIG. 5.

For example, the state/use mapping information 160 depicted in FIG. 8 has correspondence information between information of deviation item 1-N and the use.

The deviation item depicted in FIG. 8 indicates the item where the state information of the disk device "dd" where trouble sign was detected deviates from the distribution range of the state information calculated by the state information of other disk devices "dd". In addition, the use depicted in FIG. 8 indicates the handling method for the disk device "dd" where the trouble sign was detected.

According to the first line information in the state/use mapping information 160, the handling corresponding to the deviation item "access load" is a handling "lowering the access load" (striping: two disk devices).

When the access load is high, that is, when the access is concentrated in the disk device "dd" where the trouble sign was detected, it may be in a factor of the faulty of the disk device "dd". Accordingly, by setting the striping (RAID 0) that disperses the access for the disk device "dd" to the disk device "dd" where trouble sign was detected and one other disk device "dd", it become able to restrain access load.

According to the second line information in the state/use mapping information 160, the handling corresponding to a deviation item "number of bad sectors" is a handling "raise redundant degree (mirroring)". The trouble is more likely to occur in the disk device "dd" when the number of bad sectors is large. Therefore, the redundancy degree of data increases by setting the mirroring (RAID 1) for the disk device "dd" that trouble sign was detected and one other device. Therefore, it is possible to prepare for the trouble of the disk device "dd".

Similarly, according to the third line information, the handling corresponding to the deviation item "temperature" is a handling "lowering the access load" (striping: two disk devices) like the handling corresponding to the deviation item "access load". In addition, according to the fourth line information, the handling of the deviation item "operation time" is a handling "backup". The handling "backup" indicates to change a use of the disk device "dd" where the trouble sign was detected for the backup.

According to the 11th line information in the state/use mapping information 160, the handling corresponding to the deviation item "access load" and the deviation item "temperature" are a handling "lowering the access load" (striping: three disk devices). When the temperature is high in addition to access load, by more increasing the number of disk devices "dd" which is dispersed data, as compared with the case only access load is high (first line), it is possible suppress the access load more. Thereby it is possible to control a rise in the temperature.

In addition, according to the 20th line information in the state/use mapping information 160, the handling when there is not a deviation item is the handling "continuation use". When there is not a deviation item, it indicates that an abnormal state does not occur in the state information of the disk device "dd" where the trouble sign was detected. The handling "use of continuation" indicates to continue use without changing the use or the setting of the redundant degree of the disk device "dd" where the trouble sign was detected.

Furthermore, according to the 21th line information in the state/use mapping information 160, the handling when all are the deviation item is a handling "separating". When all items of the state information deviates from the distribution range of the state information calculated by the state information of other disk devices "dd", the faulty has already occurred in the disk device "dd", and data is more likely to be lost. Therefore, by separating the disk device "dd" where the trouble sign was detected, it is possible to protect memorized data and to restrain influence of the trouble on other disk device "dd".

Then, according to FIG. 9, the details of the processing of abnormality handling decision program 140 depicted in FIG. 4 and FIG. 5 will be described. In addition, according to FIG. 10-FIG. 13, an example of the processing depicted in the flow chart of FIG. 9 will be described.

Flow of Processing of Abnormality Handling Decision Program 140

Figure 9:
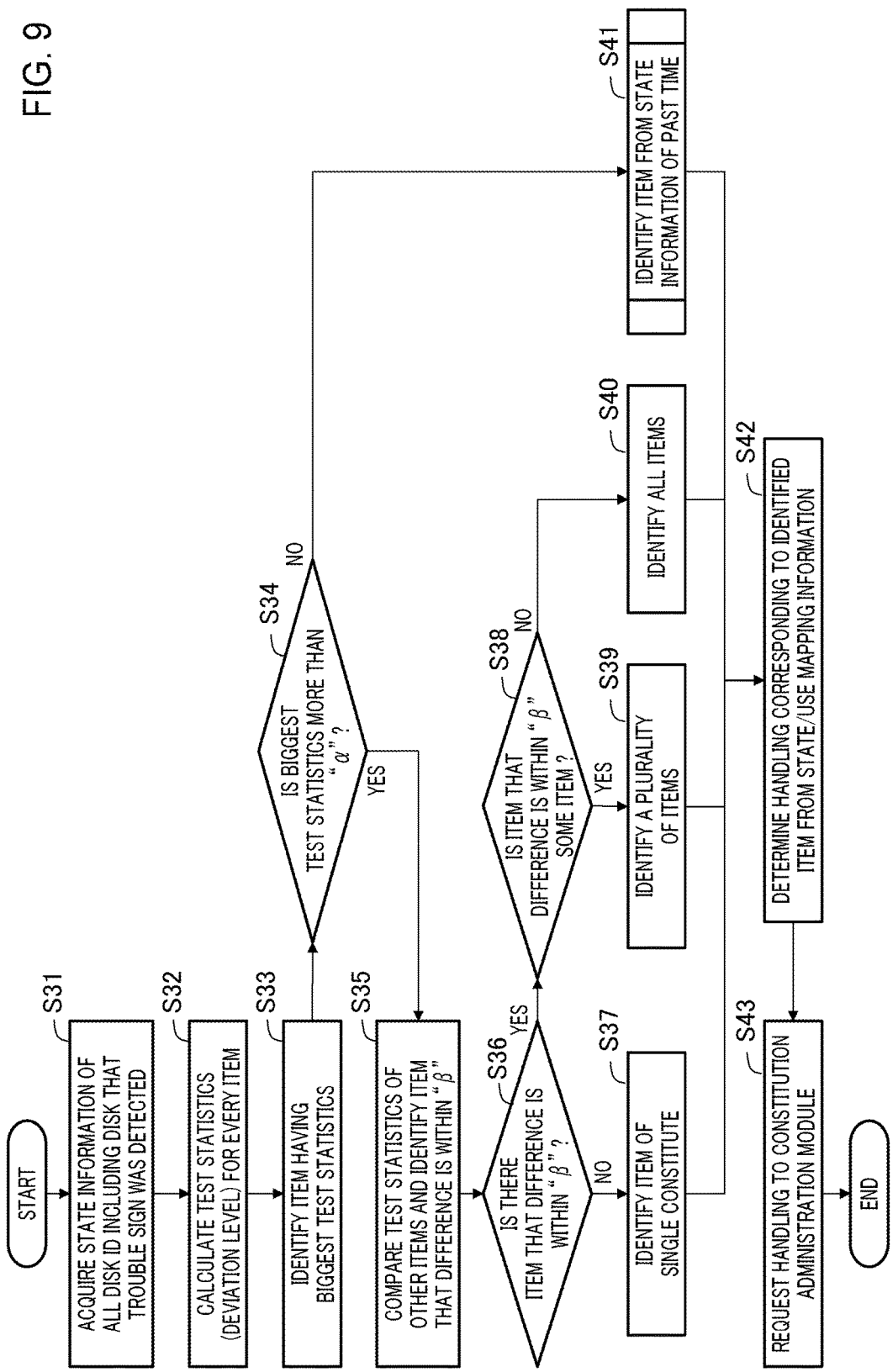
FIG. 9 is a diagram of flow chart explaining a flow of the processing of abnormality handling decision program 140 explained in FIG. 4 and FIG. 5.

FIG. 9 is a diagram of flow chart explaining a flow of the processing of abnormality handling decision program 140 explained in FIG. 4 and FIG. 5.

S31: Depending on the detection of the trouble sign, the state monitoring module 141 acquires the state information of each item of a plurality of disk devices "dd" including the disk device ID that the trouble sign was detected and memorizes it to the state information table 150 (referring to FIG. 6). For example, when detecting the trouble sign of disk device "dd2" of disk ID "0002", the state monitoring module 141 acquires the state information of the disk devices "dd1"-"ddn" of the disk ID "0001" . . . "000N" and memorizes it to the state information table 150. In addition, the state monitoring module 141 notifies the use choice module 142 of detection of the trouble sign.

S32: The use choice module 142 refers to the state information table 150 (referring to FIG. 6) in response to the notice and calculates an test statistic (also called as deviation level) based on the state information of disk devices "dd1"-"ddn" which are acquired with item by item. The deviation level indicates the degree that state information of disk device "dd2" where the trouble sign was detected deviates from the distribution range of the state information calculated by state information of other disk devices "dd1", "dd3"-"ddn". The details of the calculation processing of the deviation level will be mentioned later according to FIG. 10-FIG. 13.

S33: The use choice module 142 identifies the item which the test statistic (deviation level) has a biggest among each item which are represented in the state information table 150 (referring to FIG. 6).

S34: The use choice module 142 judges whether the biggest test statistic (deviation level) which is identified in the process S33 is more than a value "α". The "α" level according to the embodiment is a value "4.0". But the "α" level is not a thing limited to this example. For example, the "α" level is set according to the inspection, etc.

S35: When the test statistic is more than the value "α" (Yes of S34), the use choice module 142 compares the test statistic where the test statistic which is identified is the biggest and the test statics of other each item except the item of biggest test statistic. And, the use choice module 142 identifies the item having the test statistics that the difference between the biggest test statistics is within value "β".

The "β" level according to the embodiment is a value "1.0". But the "β" level is not a thing limited to this example. The "β" level, as same as the α level, is set according to the inspection, for example.

S36: The use choice module 142 judges whether or not an item having the difference value within the value "β" which is identified in the process S35 exists.

S37: When there is not an item having the difference within the value "β" (No of S36), the use choice module 142 identifies the item of the single substance as the deviation item. In other words, the use choice module 142 identifies the item having the biggest test statistics as the deviation item.

S38: When there is not an item having the difference within the value "β" (Yes of S36), the use choice module 142 identifies whether an item within value "β" is some items.

S39: When the item having the difference within value "β" is some items (Yes of S38), the use choice module 142 identifies a plurality of items as the deviation items. In other words, the use choice module 142 identifies the item where the test statistic is the biggest and some items having the difference within value "β" as the deviation items.

In this way, the abnormality handling decision program 140 calculates the deviation level indicating the degree that the state information of the first device (the disk device that trouble sign was detected) deviates from the distribution range of the state information calculated by the state information of the device except the first device for every appointed item. And, the abnormality handling decision program 140 judges that a first item having the biggest deviation value and a second item having the difference of the deviation level between the deviation level of the first item within the standard level (β level) deviate among a plurality of items.

Thereby, it is possible that the abnormality handling decision program 140 according to the embodiment identifies the item where an abnormal state appears most conspicuously by selecting an item having a maximum deviation level among a plurality of items. In addition, it is possible that the abnormality handling decision program 140 detects other items in conjunction with the item where an abnormal state appears most conspicuously, based on the difference of the deviation level with the item where the deviation level is the biggest.

The normal value ranges of the state information are different depending on the item. Accordingly, the threshold to judge the deviation level is different item by item. Therefore, it needs a man-hour and is not easy to set the threshold to judge whether the deviation level deviates item by item.

In contrast, it is possible that the abnormality handling decision program 140 according to the embodiment identifies a plurality of items where abnormality appears in the state information effectively, based on the comparison of the deviation level between the items. Thereby, it is possible that the abnormality handling decision program 140 judges easily one or more deviation items appropriately without making the threshold of the deviation level item by item.

S40: When item having the difference within value "β" is all items (No of S38), the use choice module 142 identifies all items as the deviation items.

S41: On the other hand, when the test statistic is less than the value "α" (No of S34), that is, when the test statistic of any items does not reach the value "α", the use choice module 142 judges the state information during the past appointed period. That is, the use choice module 142 identifies the deviation item based on the past state information in the period counted back to the past for a scheduled period since the trouble sign was detected to be concrete.

An abnormal state may occur irregularly, because of the state of disk device "dd". Therefore, an abnormal state may not appear in the state information when trouble sign was detected. In contrast, the use choice module 142 according to the embodiment acquires the state information of each of a plurality of disk device "dd" during the period when going back a scheduled period to since the abnormal information (trouble sign) was detected. And the use choice module 142 judges whether the state information of the first device (disk device "dd" where trouble sign was detected) deviates from the distribution range of the state information calculated by the state information of the device except the first device for every appointed items.

Thereby, it is possible that the abnormality handling decision program 140 appropriately judges the item that an abnormal state produces by being based on the state information in the past appointed period, even if the abnormality of the state information produces irregularly. Therefore, it is possible that the abnormality handling decision program 140 decides appropriate handling depending on the state of disk device "dd".

Or, although not illustrated in figures, but the use choice module 142 may judge that there is not a deviation item when the test statistic is less than value "α" (No of S34).

S42: The use choice module 142 decides the handling depending on the judgment result with reference to the state/use mapping information 160 (referring to FIG. 8).

In this way, the abnormality handling decision program 140 judges whether the state information of disk device "dd" where trouble sign was detected deviates from the distribution range of the state information calculated by the state information of other disk device "dd". And the abnormality handling decision program 140 decides appropriate handling for the disk device "dd" where trouble sign was detected based on the judgment result.

That is, the use choice module 142 decides the handling corresponding to the item concerned when there is an item that the state information of disk device "dd" where trouble sign was detected deviates from the distribution range of the state information calculated by the state information of other disk device "dd". Thereby, it is possible that the use choice module 142 decides appropriate handling depending on an item of one or more state information which appear an abnormal state.

In addition, the use choice module 142 decides the handling indicating continuously using of the disk device "dd" where trouble sign was detected, when there is not the item which deviates. Thereby, the use choice module 142 decides the handling of continuously using which does not change the disk device "dd" where trouble sign was detected, when there is not an item of the state information which appears an abnormal state.

S43: The use choice module 142 requests the constitution administration module 132 for execution of the handling such as the change of the redundant degree or the change of the use which is decided. The constitution administration module 132 realizes the handling such as the change of the redundant degree or the change of the use depending on the request through the disk interface unit 104.

In addition, in the embodiment, a plurality of disk devices "dd" included in the system are devices that a distribution range of the state information calculated by the state information in the normalcy is the same. Therefore, it is possible to judge appropriately whether an abnormal state occurs in the disk device "dd" where trouble sign was detected by comparing the state information of the disk device "dd" where trouble sign was detected with the state information of other disk device "dd". In addition, the use choice module 142 does not have to make the standard value to judge the state information item by item.

First Example

FIG. 10 is a diagram explaining the first example of the processing in flow chart of FIG. 9. FIG. 10 exemplifies a case that trouble sign occurred in the disk device "dd22 of disk ID "0002". As mentioned above, the use choice module 142 calculates a deviation level indicating the degree that the state information of disk ID "0002" deviates from the distribution range of the state information calculated by the state information of the other disk ID "0001", "0003" . . . "000N" item by item.

For example, the use choice module 142 calculates a deviation value (test statistic) according to a formula "("the value of the state information of the disk device ID that trouble sign was detected"-"average of the state information")/"standard deviation of the state information"" item by item. The average of the state information indicates a value of the average of the state information of the disk ID "0001" . . . "000N". In addition, the standard deviation of the state information is the square root of dispersion. The dispersion indicates the value that divided the value, that the square of the differences between the value of the state information of each disk ID and the average are added sequentially, is divided according to the number of the disk IDs.

In this way, the use choice module 142 calculates the calculation level that is divided the deviation of the value of the state information of the target item by the standard deviation as the deviation level. Therefore, it is possible that the use choice module 142 calculates the degree that the value of the state information of disk ID "0002" deviates from the distribution range of the value of the state information of the other disk ID "0001", "0003" . . . "000N" about the target item.

Thereby it is possible that the abnormality handling decision program 140 easily judges whether the abnormality occurs in the state information of each item of the disk device "dd2" where trouble sign was detected based on the deviation level. In addition, the calculation method of the deviation level is not a thing limited to this example. For example, the use choice module 142 may calculate a deviation level based on the expression "(the value of the state information of the disk device ID that trouble sign was detected)—(the average of the state information)".

FIG. 10 exemplifies the case that only item "access load" deviates from the distribution range of the state information calculated based on the state information of other disk ID "0001", "0003" . . . "000N". According to the example of FIG. 10, the deviation level of the item "access load" is a value "4.52". In other words, the degree, that the value "12443" of the access load of disk ID "0002" deviates from the distribution range of the access load of the other disk ID "0001", "0003" . . . "000N", is the value "4.52".

In addition, the deviation level of the item "number of bad sectors" is a value "0.44". In other words, the degree, that number of bad sectors "2" of disk device ID "0002" deviates from the distribution range of the number of bad sectors of the other disk ID "0001", "0003" . . . "000N", is the value "0.44". Similarly, the deviation level of the item "temperature" is a value "0.75" and a deviation level of the item "operation time" is a value "0.72".

Therefore, the use choice module 142 identifies the item "access load" as the item where a deviation value (test statistic) is the biggest (S33 of FIG. 9). In addition, the deviation value "4.52" of the item "access load" is bigger than the value "4.0" (α level) (Yes of S34). Therefore, the use choice module 142 judges whether there is the item that difference from the deviation level of the item "access load" is within the value "1.0" (β level) (S36).

In an example of FIG. 10, the item, where the difference of the deviation level from the item "access load" is within the value "1.0", does not exist (No of S36). Therefore, the use choice module 142 identifies only item "access load" as the deviation item (S37). And the use choice module 142 refers to the state/use mapping information 160 (referring to FIG. 8) and decides the handling "lowering the access load (striping: two disk devices)" corresponding to deviation item "access load".

And the use choice module 142 requests the constitution administration module 132 for the control that the writing of data for the disk device "dd2" distributes to the disk device "dd2" and one other disk device "dd". Thereby, it is possible to control the access load because the access for the disk device "dd2" is distributed.

In this way, it is possible that the abnormality handling decision program 140 according to the embodiment decides the handling appropriately corresponding to the item where a distribution range of the state information deviates from other disk device "dd". Therefore, it is possible that the abnormality handling decision program 140 decides appropriate handling corresponding to the state of disk device "dd" where trouble sign was detected.

Second Example

FIG. 11 is a diagram explaining the second example of the processing of flow chart in FIG. 9. FIG. 11, as same as an example of FIG. 10, exemplifies the case that trouble sign produced in the disk device "dd2" of disk ID "0002".

In the state information depicted in FIG. 11 a value of the item "temperature" is different from the state information indicating the example of FIG. 10. Therefore, according to the example of FIG. 11, the deviation levels of the item "access load", the item "number of bad sectors" and the item "operation time" are similar to an example of FIG. 10. On the other hand, the deviation level of the item "temperature" is a value "4.18" unlike an example of FIG. 10.

FIG. 11 exemplifies the case that the item "access load" and the item "temperature" deviate from the distribution range of the state information calculated by the state information of other disk ID "0001", "0003" . . . "000N". As same as an example of FIG. 10, the use choice module 142 identifies the item "access load" as the item of biggest deviation level (S33 of FIG. 9).

In addition, in an example of FIG. 11, the differences of the deviation level of the item "temperature" and deviation level of the item "access load" are within a value "1.0" (β level) (Yes of S36). Therefore, the use choice module 142 identifies the item "temperature" and the item "access load" as the deviation item (S39).

In this way, it is possible that the abnormality handling decision program 140 according to the embodiment identifies the plurality of items where the abnormality appear based on the difference of the deviation level from the item with the biggest deviation level, without establishing the threshold value by item.

In addition, as represented by the example of FIG. 11, it is possible to identify the item that the deviation level is less than the α level as the deviation item by setting a β level in a small value for an α level. For example, when the deviation level of the item "temperature" is a value "3.5", the difference of the deviation level with the item "access load" is within the value "1.0" (β level), although the deviation level is not satisfied with the α level. In this case, it is possible that the abnormality handling decision program 140 determines the item "temperature" as the deviation item.

In this way, when other one or more items except the item, that the deviation level has a biggest, indicate that the deviation degree is not remarkable but appears the abnormal value, it is possible to judge the other item as the deviation item. Therefore, it is possible that the abnormality handling decision program 140 appropriately judges the plurality of items indicating the abnormal state among items of the state information of the disk device "dd2" where trouble sign was detected.

And the use choice module 142 refers to the state/use mapping information 160 and decides the handling for the disk ID "0002" based on a combination of the item "access load" and the item "temperature" (S42). Especially, the use choice module 142 decides the handling "lowering the access load (striping: three disk devices)" corresponding to the combination of the item "access load" and the item "temperature".

According to the example of FIG. 11, in the disk ID "0002", the state information of the item "temperature" in addition to the item "access load" deviated from the distribution range of other disk device ID "0001", "0003" . . . "000N". As described in FIG. 8, when the item "temperature" is more identified as the deviation item, there is much disk device "dd" for distributing the data for an example of FIG. 10.

The use choice module 142 requests the constitution administration module 132 for the control which distributes the writing of data for the disk ID "0002" to the disk device "dd2" and two other disk devices "dd" (S43). It is possible to control the access load more and control a rise in the temperature because the access for disk device dd2 is distributed more.

In this way, it is possible that the abnormality handling decision program 140 according to the embodiment decides the handling appropriately corresponding to the item where a distribution range of the state information deviates from other disk device "dd". Therefore, it is possible that the abnormality handling decision program 140 decides appropriate handling corresponding to the state of disk device "dd" where trouble sign was detected.

Third Example

FIG. 12 is a diagram explaining the third example of the processing in flow chart of FIG. 9. FIG. 12, as same as an example of FIG. 10, exemplifies the case that trouble sign produced in the disk device "dd2" of disk ID "0002".

In the state information depicted in FIG. 12, a value of the item "number of bad sectors", a value of the item "temperature" and a value of the item "operation time" are different from the state information indicating the example of FIG. 10. Therefore, according to the example of FIG. 12, the deviation level of the item "access load" is similar to an example of FIG. 10. On the other hand, the deviation levels of the item "number of bad sectors" and the item "temperature" and the item "operation time" are different from an example of FIG. 10.

According to the example of FIG. 12, the deviation level of the item "number of bad sectors" is a value "4.13", the deviation level of the item "temperature" is a value "4.18" and the deviation level of the item "operation time" is a value "3.53". As same as an example of FIG. 10, the use choice module 142 identifies the item "access load" as the item of biggest deviation level (S33 of FIG. 9).

In addition, in an example of FIG. 12, the differences between the deviation levels of the item "number of bad sectors", of the item "temperature" and of the item "operation time" and the deviation level of the item "access load" are within a value "1.0" (β level) (Yes of S36). Therefore, the use choice module 142 identifies all the items as the deviation item (S40).

And the use choice module 142 refers to the state/use mapping information 160 and decides the handling "separating" of the disk ID "0002" based on the deviation item (S42). When all items are deviation items, trouble is more likely to really occur in the disk device "dd" of disk ID "0002". Therefore, the use choice module 142 requests the constitution administration module 132 for control of separation of the disk ID "0002" (S43).

Thereby, it is possible to suppress the influence on other disk devices "dd1", "dd3"-"ddn" while avoiding a loosing of data memorized in the disk device "dd2" of disk ID "0002". In this way, it is possible that the abnormality handling decision program 140 decides appropriate handling corresponding to the state of disk device "dd" where trouble sign was detected.

Fourth Example

FIG. 13 is a diagram explaining the fourth example of the processing of flow chart in FIG. 9. FIG. 13, as same as an example of FIG. 10, exemplifies the case that trouble sign produced in the disk device dd2 of disk ID "0002".

In the state information of FIG. 13, a value of the item "access load" is different from the state information in example of FIG. 10 and a deviation level of the item "access load" is different from an example of FIG. 10. In the example of FIG. 13, the deviation level of the item "access load" is a value "1.83", the deviation level of the item "number of the bad sectors" is a value "0.44", the deviation level of the item "temperature" is a value "0.75", and the deviation level of the item "operation time" is a value "0.72".

As same as an example of FIG. 10, the use choice module 142 identifies the item "access load" as item having the biggest deviation level (S33 of FIG. 9). But the deviation level "1.83" of the item "access load" is less than value "4.0" (No of S34).

As illustrated by an illustration of flow chart of FIG. 9, the use choice module 142 judges that there is not a deviation item, for example. In this case, the use choice module 142 decides the handling "use of continuation" as the handling of disk ID "0002" with reference to the state/use mapping information 160 (S42). And the use choice module 142 notifies, for example, constitution administration module 132 of continuously using of the disk ID "0002" (S43).

In this way, it is possible that the abnormality handling decision program 140 according to the embodiment decides the handling of continuously using of the disk device "dd2" when an abnormal state does not really occur in the disk device "dd2" where trouble sign was detected even if the trouble sign is detected. Thereby, it is possible that the abnormality handling decision program 140 decides appropriate handling corresponding to the real state of disk device "dd2" where trouble sign was detected, even if the trouble sign is detected. Therefore, because the exchange frequency of disk device dd2 decreases, it is possible to suppress the increase of the cost.

Or, as illustrated by an illustration of flow chart of FIG. 9, the use choice module 142 identifies a deviation item based on the state information during the period counted back to the past during a scheduled period (S41). The processing of process S41 will be mentioned later according to a flow chart of FIG. 14.

Flow of Processing of Abnormality Handling
Decision Program 140

Figure 14:
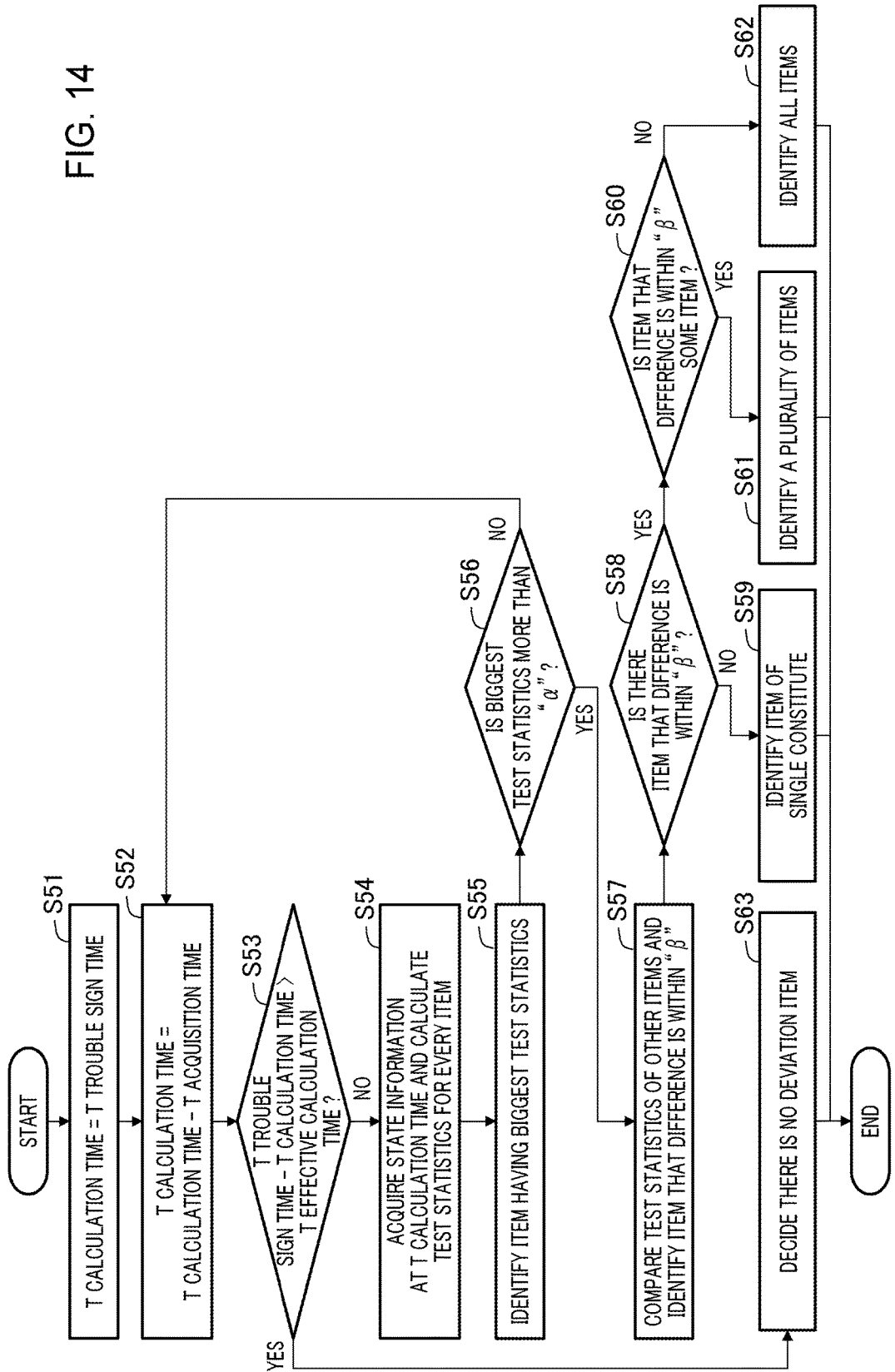
FIG. 14 is a diagram of flow chart explaining the details of the processing of process S41 in flow chart of FIG. 9.

FIG. 14 is a diagram of flow chart explaining the details of the processing of process S41 in flow chart of FIG. 9. The processing of process S55—process S62 depicted in FIG. 14 is similar to that of process S33—process S40 in the flow chart of FIG. 9.

S51: The use choice module 142 sets the value "T trouble sign time" at the value "T calculation time". In other words, the use choice module 142 sets the time when trouble sign was detected at the value "T calculation time".

S52: The use choice module 142 sets the value that subtracted the value "t acquisition time" from the value "T calculation time" to the value "T calculation time". In other words, the use choice module 142 decrements the value "T calculation time" by the value "t acquisition time".

S53: The use choice module 142 judges whether the values that subtracted the value "T calculation time" from the value "T trouble sign time" exceeds a value "t effective calculation time". In other words, the use choice module 142 judges whether a difference with the value "T trouble sign time" and the value "T calculation time" falls into "t effective calculation time".

Here, the value "t effective calculation time" and the value "t acquisition time" will be described according to FIG. 15.

(t Effective Calculation Time, t Acquisition Time)

Figure 15:
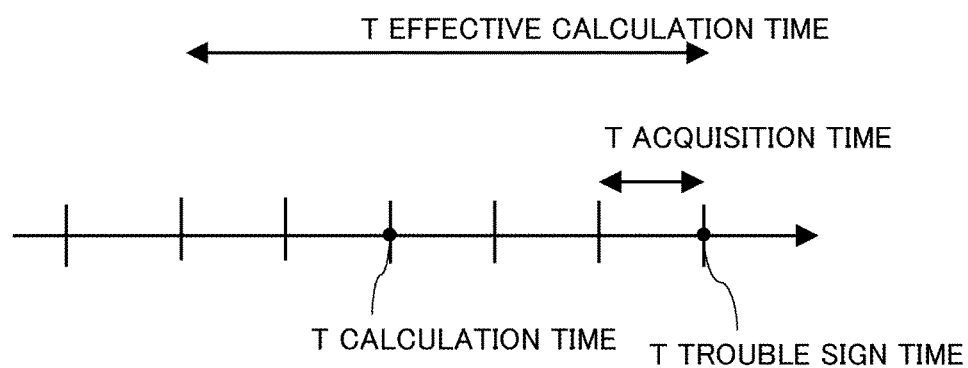
FIG. 15 is a diagram explaining value "t effective calculation time" and value "t acquisition time".

FIG. 15 is a diagram explaining value "t effective calculation time" and value "t acquisition time". The "t acquisition time" indicates time interval to acquire the state information. As mentioned above, the "t acquisition time" according to the embodiment is ten minutes. In addition, the value "T calculation time" is the value that decremented the value "T trouble sign time" sequentially for value "t acquisition time".

In addition, the "t effective calculation time" indicates the target period which is judged the state information back to the past time from "the T trouble sign time" that the trouble sign was detected. In other words, the "t effective calculation time" indicates the period when the judging of the state information counted back to the past time from "the T trouble sign time" is effective. The explanation will be continued by returning to a flow chart of FIG. 14.

S54: When the difference is not over the value "t effective calculation time" (No of S53), the use choice module 142 acquires state information of all disk devices "dd1"-"ddn" at the value "T calculation time" and memorize it to the state information table 150. And the use choice module 142 acquires the state information of disk devices "dd1"-"ddn" at the value "T calculation time", with reference to the state information table 150, and calculates the test statistic (deviation level), item by item.

In other words, the use choice module 142 calculates the test statistic (deviation level) based on the state information at "the T calculation time" when the difference with the value "T trouble sign time" falls into the "t effective calculation time", for every items. On the other hand, the use choice module 142 excludes the state information at the value "T calculation time" when the value "T calculation time" goes back more than "t effective calculation time" from the value "T trouble sign time", from the judgment target.

S55: Following process S54, the use choice module 142 identifies the item which the test statistic which is calculated in process S54 has a biggest among a plurality of items.

S56: The use choice module 142 judges whether the biggest test statistic which is identified in the process S55 is more than the value "α". When the test statistic is less than the value "α" (No of S56), the use choice module 142 moves to processing of process S52.

S57: When the test statistic is more than the value "α" (Yes of S56), the use choice module 142 compares the test statistic between the item having a biggest test statistics and each other items. The use choice module 142 identifies other items that the differences of the test statistic between the test statistics of the item that the test statistic has a biggest are within the value "β".

S58: The use choice module 142 judges there is an item that the difference is within the value "β".

S59: When there is not an item that the difference is within the value "β" (No of S58), the use choice module 142 judges the item of the simple substance as the deviation item.

S60: When there is an item that the difference is within the value "β" (Yes of S58), the use choice module 142 judges whether items that the difference is within value "β" is some items.

S61: When an item that the difference is within value "β" is some items (Yes of S60), the use choice module 142 judges a plurality of items as the deviation item.

S62: On the other hand, when an item that the difference is within value "β" is all items (No of S60), the use choice module 142 judges all items as the deviation item.

S63: when the difference is beyond value "t effective calculation time" (YES of S53), the use choice module 142 determines there is no deviation item. In other words, the use choice module 142 determines that the deviation item does not exist.

In this way, it is possible that the use choice module 142 decides appropriate handling depending on a state of disk device "dd" by being based on the state information during the period that it is effective to judge the state information of day counted back to the past time from "the T trouble sign time" that the trouble sign was detected. Therefore, it is possible that the use choice module 142 decides appropriate handling according to a state of disk device "dd" even if the abnormality of the state information produces irregularly.

Other Embodiment

In addition, the embodiment described above exemplified an example of handling for the detection of the trouble sign in the disk device group 105 of the simple substance. But the embodiment is effective for the disk device "dd" included in a plurality of disk device groups. The system according to the other embodiment has a plurality of disk device groups including a plurality of disk devices "dd" each.

The disk device group that a distribution range of the state information calculated by the state information in the normalcy is the same indicates the plurality of disk device groups that access frequency and duties to carry out are similar. In this case, it is possible to integrate disk devices "dd" in the plurality of disk device groups as the target disk device "dd" that the state information is compared with the disk device "dd" where trouble sign was detected. Therefore, because the number of disk device "dd" for the comparison increases, it is possible to improve the judgment precision of the state information.

Storage System in Other Embodiment

Figure 16:
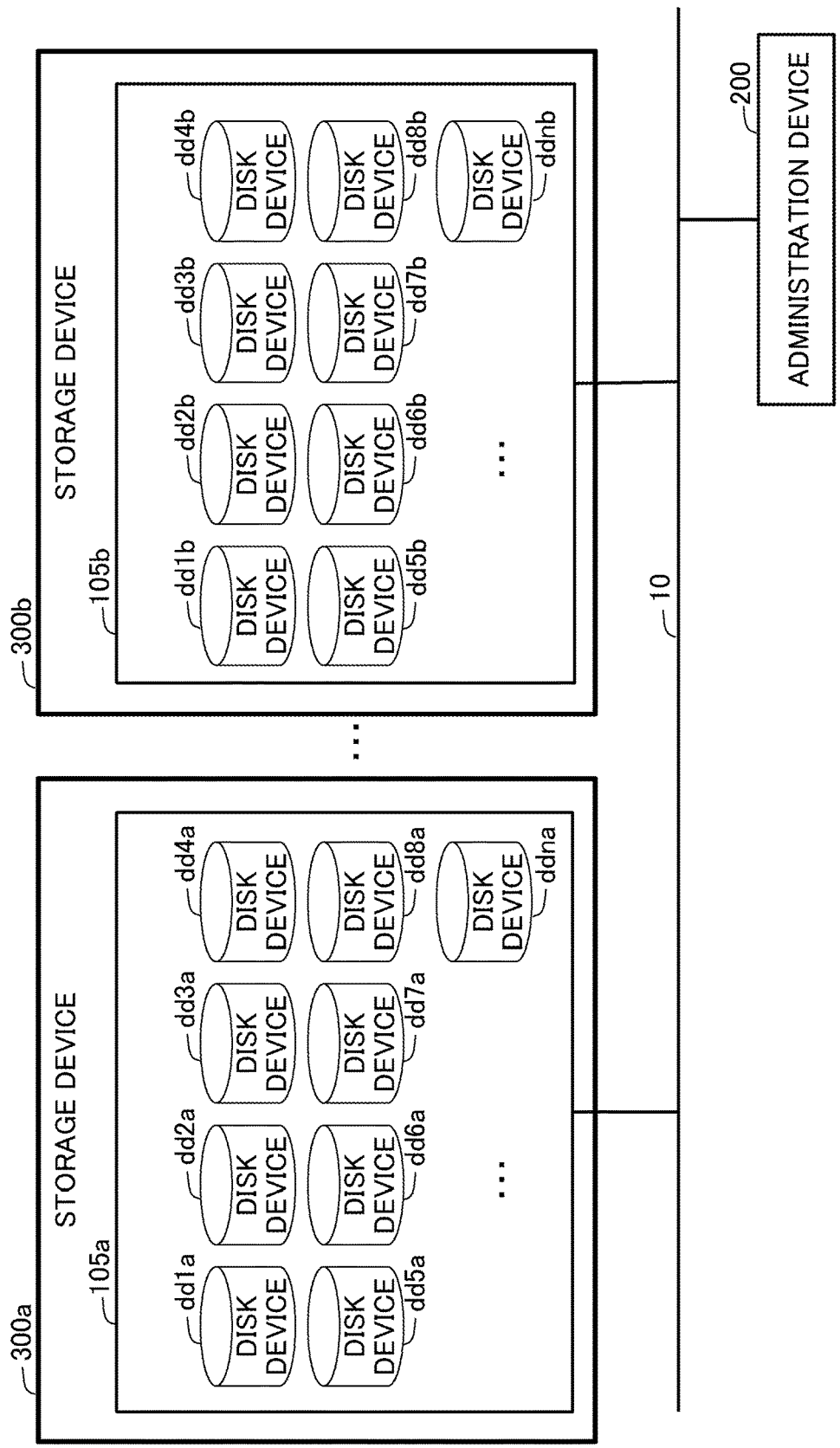
FIG. 16 is a diagram indicating an example of the storage system according to the other embodiment.

FIG. 16 is a diagram indicating an example of the storage system according to the other embodiment. The storage system depicted in FIG. 16 has an administration device 200 and two storage devices 300a, 300b. Each of the storage devices 300a, 300b is connected to the administration device 200 through the network, etc. The storage device 300a has a disk device group 105a, and the storage device 300b has a disk device group 105b.

The administration device 200 decides the handling for the disk device "dd" where trouble sign was detected depending on the detection of the trouble sign of the disk device (also called as "dd1a"-"ddnb", disk device "dd") in each of disk device groups 105a, 105b, and notifies it to the storage device 300a, 300b.

As illustrated in FIG. 16, in the plurality of disk device groups 105b, 105b, the total number of the disk devices "dd" is large. Therefore, it is possible that the abnormality handling decision program 140 judges an item of the state information indicating the abnormal state more highly precise by being based on a comparison of the state information with large number of the disk devices "dd".

Hardware Constitution of Administration Device 200

Figure 17:
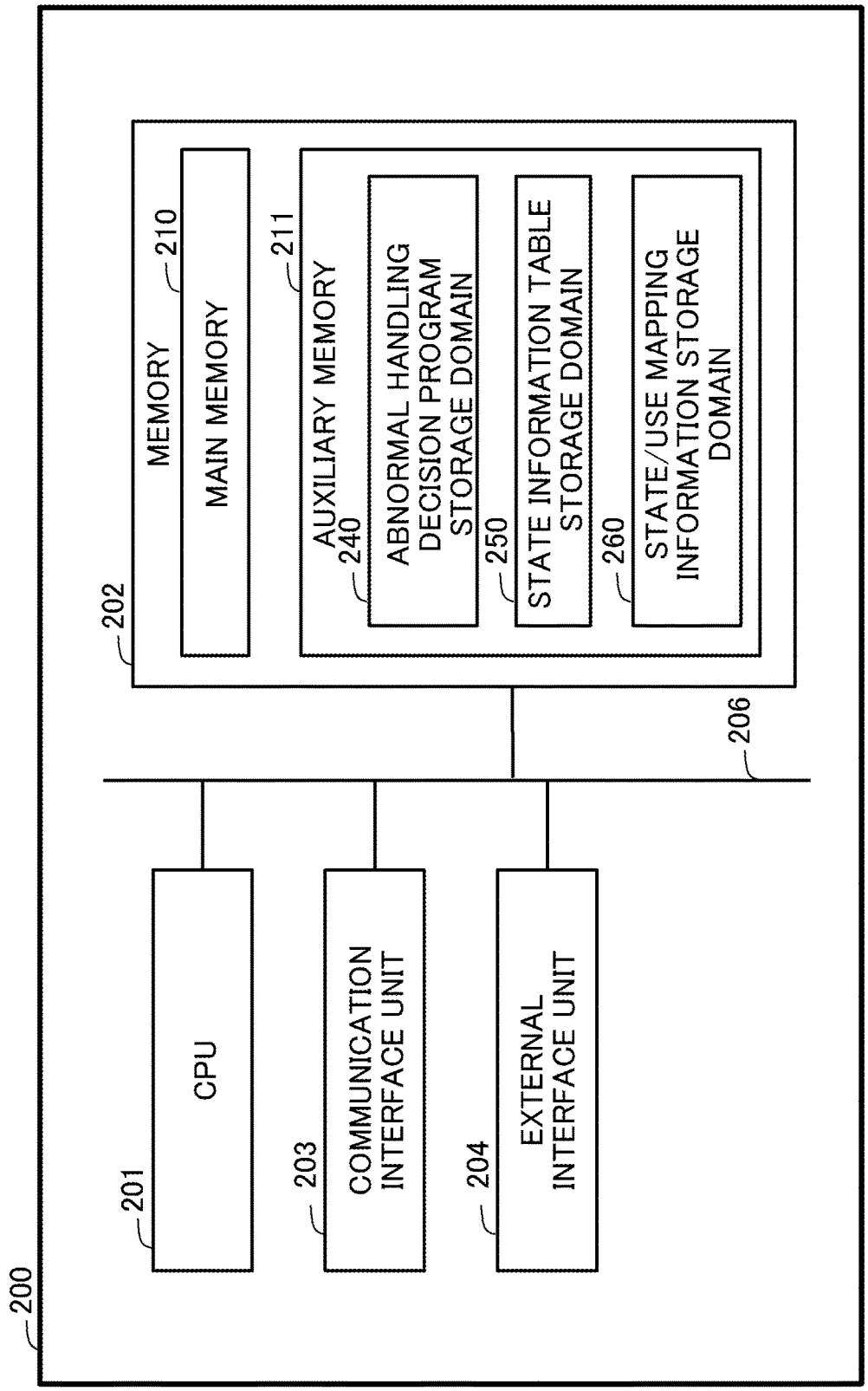
FIG. 17 is a diagram indicating an example of the hardware constitution of administration device 200 depicted in FIG. 16.

FIG. 17 is a diagram indicating an example of the hardware constitution of administration device 200 depicted in FIG. 16. The administration device 200 has a CPU 201, a memory 202 including a main memory 210 and an auxiliary memory 211, etc., a communication interface unit 203, and an external interface unit 204. The all parts are connected through a bus 206 mutually.

The CPU 201 is connected to the memory 202, etc. through the bus 206 and controls the whole administration device 200. The communication interface unit 203 is connected to other apparatuses (not illustrated in FIG. 17) through the Internet and transmits and receives data.

The main memory 210 such as a RAM (Random Access Memory) memorizes the data that the CPU 201 processes. The auxiliary memory 211 includes an HDD, or a nonvolatile semiconductor memory. The auxiliary memory 211 has domains (not illustrated in FIG. 17) storing the program of the operation system that the CPU 201 carries out. In addition, the auxiliary memory 211 has an abnormality handling decision program storage domain 240, a state information table storage domain 250, and a state/use mapping information storage domain 260.

The abnormal handling decision program (below called as abnormality handling decision program 240) in the abnormality handling decision program storage domain 240 realizes decision processing of the handling for the disk device "dd" depending on the detection of the trouble sign of disk device "dd" by execution of the CPU 201.

A state information table (called as state information table 250 as follows) in the state information table storage domain 250 is the table that the abnormality handling decision program 240 accesses and has state information of disk device dd in each disk device groups 150a, 150b. The details of the state information table 250 will be mentioned later according to FIG. 18. The state/use mapping information (below called as state/use mapping information 260) in the state/use mapping information storage domain 260 is similar to that in FIG. 8.

Software Block of Storage System

Figure 18:
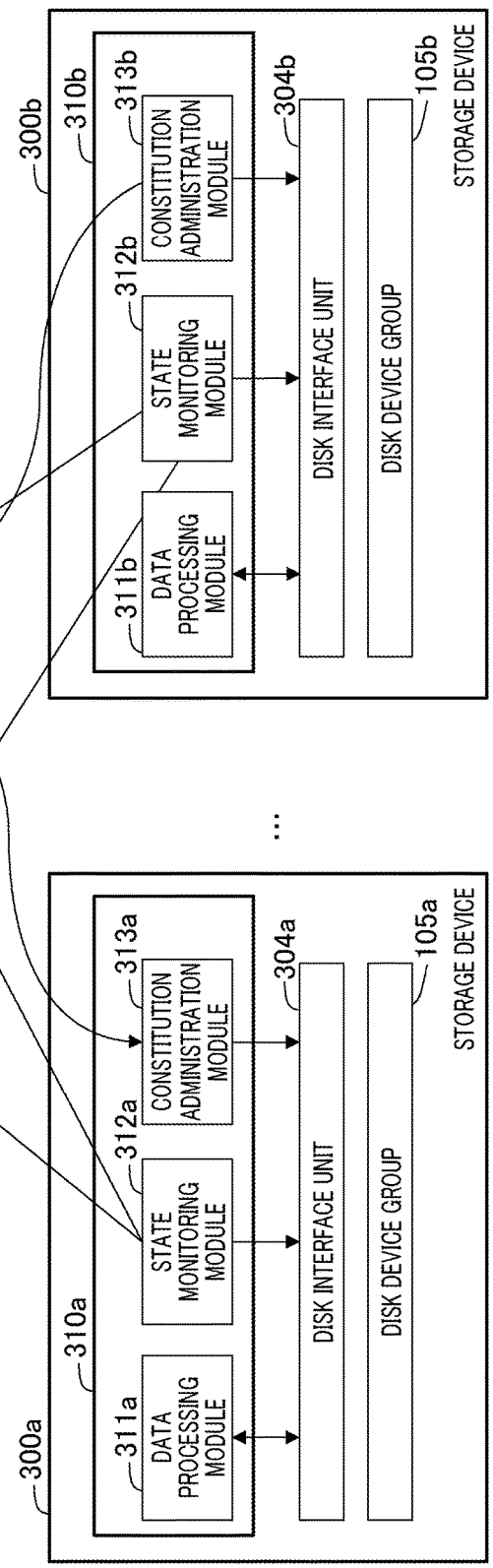
FIG. 18 is a diagram indicating an example of the software block of the storage system depicted in FIG. 16.

FIG. 18 is a diagram indicating an example of the software block of the storage system depicted in FIG. 16. The storage control program 310a in the storage device 300a has a data processing module 311a, a state monitoring module 312a, and a constitution administration module 313a. In addition, the storage control program 310b in the storage device 300b has a similar module, too.

The data processing module 311a instructs the access processing for the disk device "dd" to the disk interface unit 304a in response to a command to order the access of data which is sent by other devices.

The state monitoring module 312a acquires the state information of each disk device "dd" in the disk device group 105a regularly, and transmits it to the administration device 200. In addition, the state monitoring module 312a sends the state information of each disk device "dd" to the administration device 200 depending on the detection of the trouble sign of the disk device "dd" in the disk device group 105a and notifies the administration device 200 and the storage device 300b of outbreak of the trouble sign. In addition, the state monitoring module 312a sends the state information of each disk device "dd" to the administration device 200 in response to the notice of the detection of the trouble sign of other storage device 300b.

In addition, the constitution administration module 313a manages the information about the constitution of each disk device "dd" in the disk device group 105a. In addition, the constitution administration module 313a receives the handling for the disk device "dd" where trouble sign was detected by the administration device 200 and carries out the handling such as the change of the redundant degree of the RAID or the use change of disk device "dd".

In addition, the abnormality handling decision program 240 in the administration device 200 has a use choice module 241. When the use choice module 241 receives a notice indicating the detection of the trouble sign from the storage device 300a, 300b and the state information of each disk device "dd" in a plurality of disk device groups 105a, 105b, the use choice module 241 memorizes it to the state information table 250.

And the use choice module 241 judges whether the state information of the disk device "dd" where trouble sign was detected deviates from the distribution range of the state information calculated by the state information of disk devices "dd" in the plurality of disk device groups 105a, 105b, for every item. In addition, the use choice module 241 decides the handling for the disk device "dd" where the trouble sign was detected with reference to the state/use mapping information 260 based on the judgment result.

And the use choice module 241 notifies the storage device 300a, 300b having the disk device "dd" where the trouble sign was detected of the decided handling.

State Information Table 250

FIG. 19 is a diagram indicating an example of state information table 250 according to the other embodiment. The state information table 250 depicted in FIG. 19 has device ID to distinguish the disk device group 105a, 105b in addition to the information of state information table 150 (referring to FIG. 6). As illustrated in FIG. 19, the state information table 250 has state information of a plurality of disk device groups 105a, 105b.

The processing of the abnormality handling decision program 240 depicted in FIG. 17 and FIG. 18 is same as the processing indicated in the flow chart in FIG. 9, FIG. 14. In other words, the abnormality handling decision program 240 judges whether the state information of the disk device that the trouble sign was detected deviates from the distribution range of the state information calculated by the state information of the devices except the disk device that the trouble sign was detected in the plurality of disk device groups 105a, 105b. Thereby, the number of disk devices "dd" for the comparison target increases, therefore the judgment precision of the state information improves.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium storing therein an abnormality handling determination program that causes a computer to execute a process, the process comprising:
    detecting abnormal information of a first device among a plurality of devices;
    acquiring state information of a plurality of items which is related to a state of the plurality of devices from each of the plurality of devices;
    calculating a distribution range of the state information of a plurality of devices other than the first device among the plurality of devices for each of the plurality of items;
    judging whether the state information of the first device deviates from the distribution range of the state information for each of the plurality of items; and
    determining a handling process for the first device based on an item which is judged that the state information of the first device is deviated from the distribution range among the plurality of the items.

2. The storage medium according to claim 1, wherein the determining comprises determining the handling process of continuous use of the first device, when judging that the distribution range of all of the plurality of items is not deviated.

3. The storage medium according to claim 1, wherein the plurality of devices has a same distribution range of the state information when normal.

4. The storage medium according to claim 1, wherein the judging comprises:
    calculating a deviation level indicating a deviation degree that the state information of the first device deviates from the distribution range of the state information calculated by the state information of the plurality of devices other than the first device for each of the plurality of items; and
    judging a first item that the deviation level is greatest among a plurality of items, and a second item that a difference of the deviation level from the first item is within a standard value, as an item that the state information of the first device is deviated.

5. The storage medium according to claim 1, wherein the judging further comprises:
    acquiring the state information of each of the plurality of devices during a period counted back to a past for a scheduled period since the abnormal information was detected; and
    judging whether the acquired state information of the first device deviates from the distribution range of the state information calculated by the acquired state information of the plurality of devices other than the first device for each of the plurality of items.

6. The storage medium according to claim 1, wherein the acquiring comprises acquiring the state information of the plurality of items regarding to the state of each of the plurality of storage devices.

7. The storage medium according to claim 1, wherein the acquiring comprises acquiring the state information of the plurality of items, which is either one or combination of an access load for a device, a temperature of the device, a number of abnormal parts in the device and an operation time of the device.

8. The storage medium according to claim 1, wherein the acquiring comprises acquiring the state information of the plurality of items regarding to the state of each of the plurality of storage devices in a plurality of disk device groups.

9. A method for abnormality handling determination, the method comprising:
    detecting, by a processor, abnormal information of a first device among a plurality of devices;
    acquiring, by the processor, state information of a plurality of items which is related to a state of the plurality of devices from each of the plurality of devices;
    calculating, by the processor, a distribution range of the state information of a plurality of devices other than the first device among the plurality of devices for each of the plurality of items;
    judging, by the processor, whether the state information of the first device deviates from the distribution range of the state information for each of the plurality of items; and
    determining, by the processor, a handling process for the first device based on an item which is judged that the state information of the first device is deviated from the distribution range among the plurality of the items.

10. The method according to claim 9, wherein the determining comprises determining the handling process of continuous use of the first device, when judging that the distribution range of all of the plurality of items is not deviated.

11. The method according to claim 9, wherein the plurality of devices has a same distribution range of the state information when normal.

12. The method according to claim 9, wherein the judging comprises:
    calculating a deviation level indicating a deviation degree that the state information of the first device deviates from the distribution range of the state information calculated by the state information of the plurality of devices other than the first device for each of the plurality of items; and
    judging a first item that the deviation level is greatest among a plurality of items, and a second item that a difference of the deviation level from the first item is within a standard value, as an item that the state information of the first device is deviated.

13. The method according to claim 9, wherein the judging further comprises:
    acquiring the state information of each of the plurality of devices during a period counted back to a past for a scheduled period since the abnormal information was detected; and
    judging whether the acquired state information of the first device deviates from the distribution range of the state information calculated by the acquired state information of the plurality of devices other than the first device for each of the plurality of items.

14. The method according to claim 9, wherein the acquiring comprises acquiring the state information of the plurality of items, which is either one or combination of an access load for a device, a temperature of the device, a number of abnormal parts in the device and an operation time of the device.

15. An administration device comprising:
a processor configured to detect an abnormal information of a first device among a plurality of devices, acquire state information of an plurality of items which is related to a state of the plurality of devices from each of the plurality of devices calculate a distribution range of the state information of a plurality of devices other than the first device among the plurality of devices for each of the plurality of items, judge whether the state information of the first device deviates from the distribution range of the state information for each of the plurality of items and determine a handling process for the first device based on an item which is judged that the state information of the first device is deviated from the distribution range among the plurality of the items; and
a memory that stores the state information of the plurality of devices.

16. The administration device according to claim 15, wherein the processor acquires the state information of the plurality of items regarding to the state of each of the plurality of storage devices.

17. The administration device according to claim 15, wherein the processor acquires the state information of the plurality of items regarding to the state of each of the plurality of storage devices in a plurality of disk device groups.

* * * * *